No. 719,535. PATENTED FEB. 3, 1903.
A. TUFANI.
DUMPING WAGON.
APPLICATION FILED APR. 16, 1902.
NO MODEL. 2 SHEETS—SHEET 1.
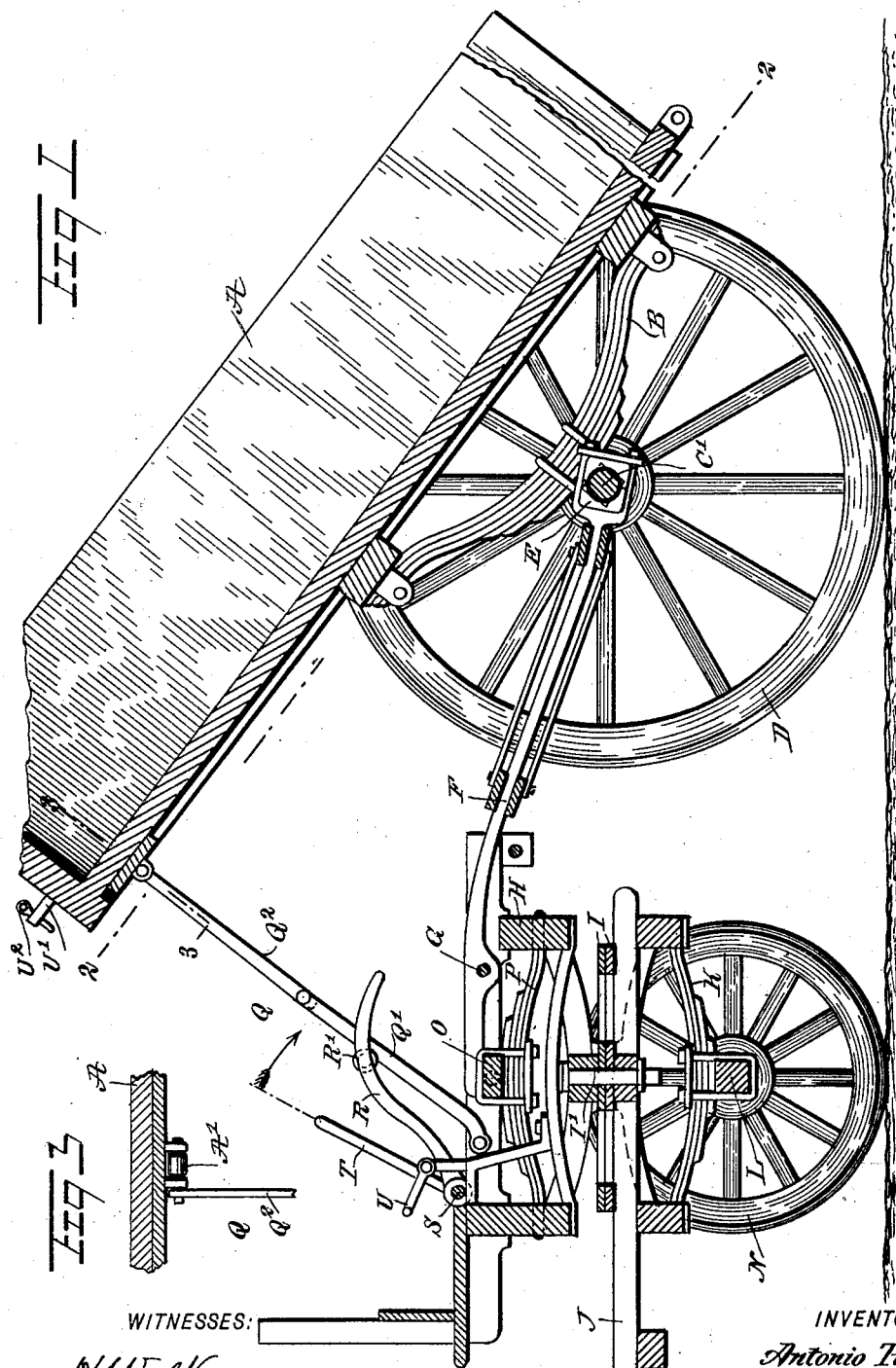
INVENTOR
Antonio Tufani
BY
ATTORNEYS.
WITNESSES:
H. Walker
Theo. G. Hoster No. 719,535. PATENTED FEB. 3, 1903.
A. TUFANI.
DUMPING WAGON.
APPLICATION FILED APR. 16, 1902.
NO MODEL. 2 SHEETS—SHEET 2.
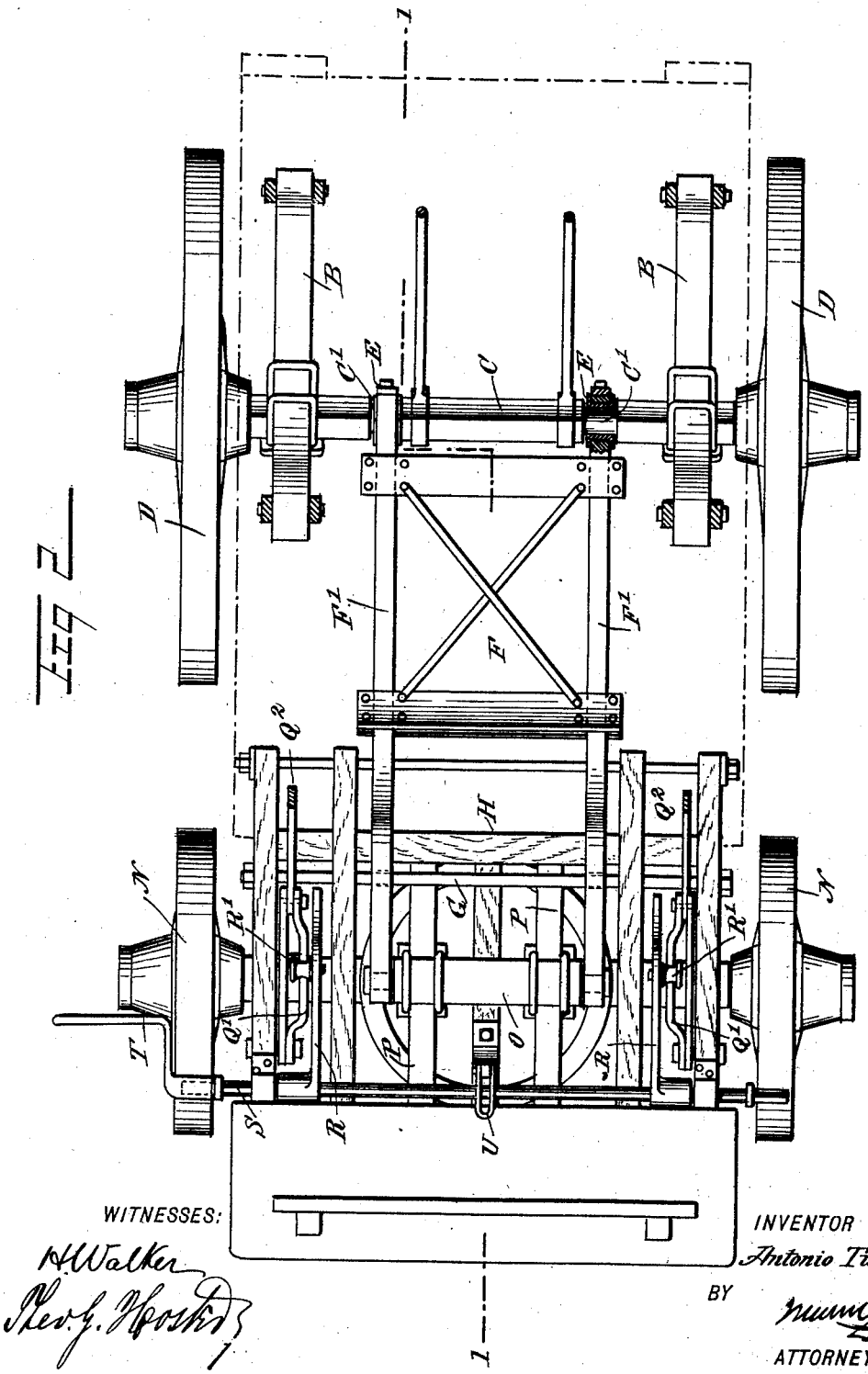
WITNESSES:
INVENTOR
Antonio Tufani
BY
ATTORNEYS.

UNITED STATES PATENT OFFICE.

ANTONIO TUFANI, OF NEW YORK, N. Y.

DUMPING-WAGON.

SPECIFICATION forming part of Letters Patent No. 719,535, dated February 3, 1903.

Application filed April 16, 1902. Serial No. 103,161. (No model.)

*To all whom it may concern:*

Be it known that I, ANTONIO TUFANI, a subject of the King of Italy, and a resident of the city of New York, borough of Manhattan, in the county and State of New York, have invented a new and Improved Dumping-Wagon, of which the following is a full, clear, and exact description.

The object of the invention is to provide a new and improved dumping-wagon which is simple and durable in construction and easily manipulated for moving the wagon bed or box into an inclined dumping position or back to a non-dumping position.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement on the line 1 1 of Fig. 2, showing the wagon-body in a dumping position. Fig. 2 is a sectional plan view of the same on the line 2 2 of Fig. 1, and Fig. 3 is a transverse section of part of the improvement on the line 3 3 of Fig. 1.

The wagon box or bed A is hung at its rear portion on longitudinally-extending leaf-springs B, clipped or otherwise secured at their middle to the rear axle C, carrying the rear wheels D. The rear axle C is formed with journal portions C', engaged by boxes E, held in the rear ends of the connected side bars F' of the reach F, extending forwardly and having the side bars F' fulcrumed near the forward ends of the reach on the transverse rod G, attached to the bolster-frame H, connected by the fifth-wheel I and the king-bolt I' with the truck-frame J, supported by springs K from the front axle L, carrying the front wheels N.

The extreme front ends of the reach side bars F' are pivotally connected with the transverse beam O, clipped or otherwise secured to the leaf-springs P, extending longitudinally and supported at their free ends on the bolster-frame H, the said beam O being located above the king-bolt I', as plainly shown in Fig. 1.

The under side of the wagon bed or box A is pivotally connected at its forward portion by links Q with the forward portion of the bolster-frame H, and each link Q consists of two members Q' and Q², having a knee-joint connection with each other, of which the members Q' of the links Q are adapted to be engaged by friction-rollers R', journaled on curved arms R, projecting rearwardly from a transverse shaft S, journaled in suitable bearings held in the forward portion of the bolster-frame H.

The polygonal ends of the shaft S extend to the sides of the wagon, allowing application of a crank T, adapted to be turned by the operator for turning the shaft S to impart a swinging motion to the curved arms R. The curved arms R are adapted to engage friction-rollers A', (see Fig. 3,) journaled on the under side of the wagon bed or box, near the front end thereof, at the time the front end of the wagon box or bed is resting on the bolster-frame H, the said wagon-bed being then in a normal position.

When it is desired to swing the wagon bed or box A into an inclined position to dump the contents of the bed or box, then the operator turns the crank T to cause an upward swinging motion of the arms R, so that the said arms in acting on the friction-rollers A' impart an upward swinging motion to the forward end of the wagon box or bed A, the latter then turning with the axle C as the fulcrum. The arms R impart the swinging motion referred to to the wagon box or bed A until the center of gravity of the bed or box is rearward of the center of the axle C, so that the box or bed now swings of its own accord into the final dumping position shown in Fig. 1. During this movement the members Q' and Q² of the links Q are moved into an extended position to finally limit the upward swinging motion of the forward end of the box or bed A. Now when the links Q are extended, as described, the forward edges of the lower members Q' rest on the peripheral surface of the friction-rollers R', as indicated in Fig. 1. Now when it is desired to impart a return swinging motion to the wagon box or bed A then the operator actuates the crank T to turn the shaft S in a reverse direction to cause the arms R to swing rearwardly and downwardly, thus causing the friction-rollers R' to bear on the lower members Q' of the links Q, to swing the said members downwardly and rearwardly, to fold both members of each link, and thereby draw the front end of the wagon box or bed A downward until the front end of the wagon box or bed is seated on the top of the bolster-frame H. The box or bed A is now back in a normal position and can be locked therein by a suitable locking device, preferably a loop U, fulcrumed on the bolster-frame H and adapted to engage a keeper U', projecting from the front of the wagon box or bed A. A pin U² is inserted in the keeper U' after the loop U is engaged therewith to hold the loop against accidental displacement on the keeper U'. It is understood that previous to swinging the wagon box or bed A into a dumping position it is necessary to disengage the loop U from the keeper U'.

By having the reach F fulcrumed on the bolster-frame and connected with the beam O, spring-supported from the bolster-frame, I provide an equalizing device to allow easy running of the wagon over uneven ground without affecting the horizontal position of the pole, thus relieving the team of undue strain.

Having thus described my invention, I claim as new and desire to secure by Letters Patent—

1. A dumping-wagon having a wagon-box mounted to swing, a sectional link connecting the box with the front portion of the wagon-gear, a shaft journaled on the wagon-gear at the forward portion thereof, and a rearwardly-extending curved arm on said shaft carrying a friction-roller, the said arm alternately engaging the wagon-body and the said sectional link, as set forth.

2. A dumping-wagon having a box mounted to swing, sectional links pivotally connecting the front portion of the box with the front portion of the wagon-gear, a shaft journaled on the wagon-gear, rearwardly-extending arms on the said shaft and adapted when the shaft is turned in one direction to engage the under side of the wagon-box near the front thereof to impart an initial swinging motion to the same for dumping purposes, the said arms, when the shaft is turned in the opposite direction, being adapted to engage the lower members of the sectional links to fold the members of each link and thereby swing the wagon-box back into a normal position, as set forth.

3. A dumping-wagon, comprising a wagon-box, a rear axle, springs supporting the said wagon-box, a reach pivotally connected with the rear axle, and a bolster-frame on which the reach is fulcrumed, the said bolster-frame carrying springs supporting a beam, on which the reach is fulcrumed, as set forth.

4. A dumping-wagon, comprising a wagon-box, a rear axle, springs supporting the said wagon-box, a reach pivotally connected with the rear axle, a bolster-frame on which the reach is fulcrumed, the said bolster-frame carrying springs supporting a beam, on which the reach is fulcrumed, and a sectional link for connecting the wagon-box with the said bolster-frame, as set forth.

5. A dumping-wagon, comprising a wagon-box, a rear axle, springs supporting the said wagon-box, a reach pivotally connected with the rear axle, a bolster-frame on which the reach is fulcrumed, the said bolster-frame carrying springs supporting a beam, on which the reach is fulcrumed, a sectional link for connecting the wagon-box with the said bolster-frame, a shaft journaled on the bolster-frame and under the control of the operator, and a curved arm secured to the shaft and adapted to engage the said wagon-box, to impart an initial swinging motion to the same on turning the shaft in one direction, the arm being also adapted to engage a member of the said sectional link, to close the latter on turning the shaft in the opposite direction, to cause the link to swing the wagon-box back from a dumping position to a normal position, as set forth.

6. A dumping-wagon, comprising a wagon-box, a rear axle, a front bolster-frame, a reach connected with the rear axle and fulcrumed on the said bolster-frame, and a spring device on the bolster-frame, connected with the said pivoted reach, as set forth.

7. A dumping-wagon, having a box mounted to swing, a sectional link connecting the forward portion of the box with the forward portion of the bolster-frame, a transverse shaft journaled in the forward portion of the bolster-frame, and a rearwardly-extending arm on said shaft adapted to engage with its free end the under side of the wagon-box, near the front thereof, the said arm being also adapted to engage a member of the said link, as set forth.

8. A dumping-wagon having a wagon-box mounted to swing, sectional links connecting the box with the forward portion of the bolster-frame, a shaft journaled in the forward portion of the bolster-frame, and rearwardly-projecting curved arms on the said shaft adapted to engage friction-rollers on the under side of the wagon-box near the front thereof, the said arms being provided with friction-rollers adapted to engage members of the said links, for the purpose set forth.

In testimony whereof I have signed my name to this specification in the presence of two subscribing witnesses.

ANTONIO TUFANI.

Witnesses:
. THEO. G. HOSTER,
EVERARD BOLTON MARSHALL.